INVENTORS
HORACE T. PENTECOST
ALBERT W. BLILER
WAINE ARCHER JR.
DUDLEY NICHOLLS
BY Reynolds & Beach
ATTORNEYS INVENTORS
HORACE T. PENTECOST
ALBERT W. BLILER
WAINE ARCHER JR.
DUDLEY NICHOLLS
BY Reynolds & Beach
ATTORNEYS

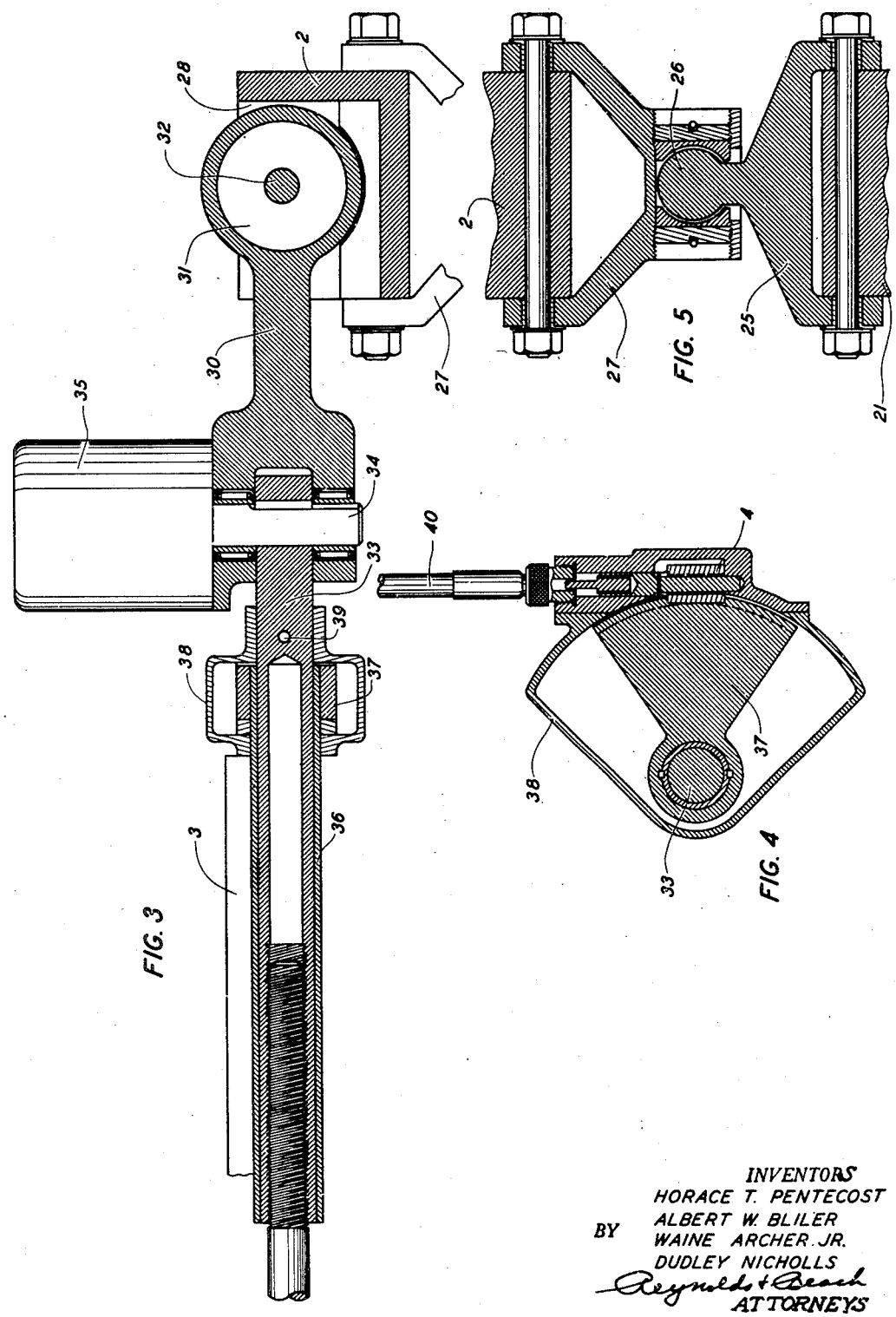

Patented July 5, 1949

2,475,293

UNITED STATES PATENT OFFICE 2,475,293

AIRCRAFT ROTOR DRIVE

Horace T. Pentecost, Albert W. Bliler, Dudley Nicholls, and Waine Archer, Jr., near Seattle, Wash., assignors to Boeing Airplane Company, a corporation of Delaware Application September 18, 1944, Serial No. 554,624

12 Claims. (Cl. 170—160.25)

Our invention relates to drive and control mechanism for the rotor of rotating wing aircraft such, for example, as a helicopter or autogiro.

In rotary wing aircraft the individual rotor blades should be free floating to some extent. Their mounting should enable each blade, independently of the other blades, to rotate about its longitudinal axis, to change its angle of attack, to flap for effecting upward or downward movement of its tip relative to its root, and to swing enabling its tip to advance forward or to lag rearward circumferentially with relation to its root. Movement of a blade in each of these respects is limited. Moreover, while one or more of these changes in position may be effected by aerodynamic forces acting upon the blade, another type of movement may be produced by positive control mechanism governed by the pilot of the aircraft.

It will be evident that if a blade is to be thus movable universally with respect to the rotary wing hub within limits, the root of each blade must be supported by a universal joint. In addition it is desirable for the hub to be tiltable as a whole relative to the aircraft to control the direction of the rotor lift force.

Heretofore the blades of rotary wing aircraft have been mounted for individual limited universal movement relative to their hub. Moreover such hub mounting itself has been tiltable within limits relative to the aircraft. The difficulty with such prior installations, however, has been that the control mechanism provided to effect the latter regulation by the pilot was inadequate or inefficient. Moreover, in installations enabling the blade hub to tilt relative to the aircraft supporting structure, the blade hub was subjected to positive and negative accelerations in various rotative positions, which caused the blades to whip. In a helicopter the angular velocity of the blades in certain rotative positions during each revolution would be greater than that in other rotative positions, despite turning of the hub driving mechanism at a constant angular velocity.

It is therefore a principal object of our invention to provide a blade mounting hub tiltable relative to the aircraft, in which the hub rotating mechanism is separate from the aircraft supporting hub connection, so that the drive mechanism may be rotated at a constant angular velocity, to rotate the blade hub at a corresponding constant angular velocity regardless of the degree or direction of hub tilt. Such hub rotating connection need not carry any thrust load axially of the hub.

An additional object is to provide a connection for each blade to the hub which will enable the blade to swing universally relative to such hub about three mutually perpendicular axes, and which enables control mechanism carried by the aircraft to be operatively connected to each blade for controlling its movement about one of such axes at the will of the pilot. More specifically it is an object to enable the pilot to turn the blades about their longitudinal axes to alter their angles of attack, and in particular to change the angles of the several blades unequally, but to control the blades so that the angle of attack of each varies in such manner as it rotates that all blades will successively assume the same angle of attack as they pass through any given orbital position.

Additional objects of our invention which are achieved more especially by the particular type of construction which we prefer will be suggested by the detailed discussion of our device which follows. It is to be understood, of course, that the principles of our invention may be embodied in structures varying considerably in detail from the preferred embodiment disclosed herein.

Figure 1:
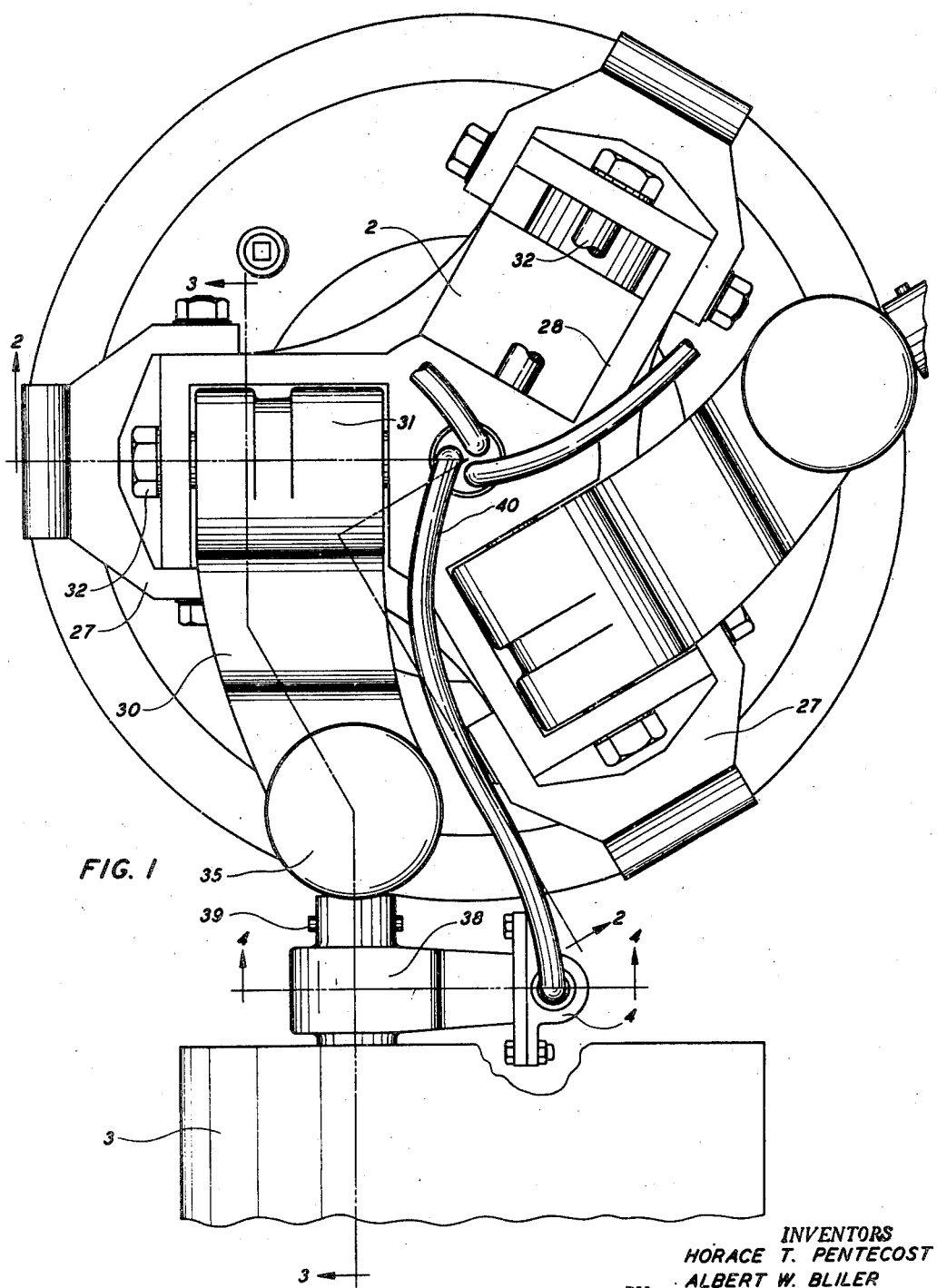
Figure 1 is a plan view of a rotary wing mounting hub adapted to support three blades, parts of which blades and mount have been broken away.

Figure 3 is a sectional view through the structure attaching a blade to the hub taken on line 3—3 of Figure 1. Figure 4 is a detail sectional view through the angle of attack control mechanism for a single blade on line 4—4 of Figure 1. Figure 5 is a detail sectional view of the rotative drive connection between the blade supporting hub and the hub drive member as viewed on line 5—5 of Figure 2.

We have illustrated our invention in a form particularly applicable to an aircraft in which the rotary wings are driven positively by an engine, such as a helicopter. In this instance employment of only a single rotor is contemplated, which is located substantially above the center of gravity of the aircraft and rotates about an upright axis.

Since helicopters of this general type are well known, the fuselage and other conventional features have not been shown in the drawings and will not be described. The fuselage would be suitably attached to supporting means in the form of a casing 1, to which the lift force produced by the rotor is transmitted for carrying the weight of the aircraft. Within a recess in this casing a thrust antifriction bearing 10 is received, against the under side of which bears a shoulder on an upright tubular shaft 11 extending through bearing 10. The upper end of this hollow shaft is supported from the rotor by a thrust bearing 12 received in a recess in its upper end.

A hollow spindle 13 extends downward into the upper open end of tubular shaft 11, and these elements are held in precise coaxial relationship by a combined radial and thrust bearing 14, the outer race of which rests upon a shoulder in the upper end of shaft 11. A ridge 15 on spindle 13 seats upon the inner race of bearing 14 so that when the helicopter is on the ground this bearing will support the rotor mechanism. The upward force on spindle 13 is transmitted to thrust bearing 12 by a collar 16 which is screwed onto the lower end of the spindle sufficiently to bear firmly against the lower race of such bearing.

The upward thrust force of the rotor blades on hub 2 is transmitted to spindle 13 by a joint 17 interconnecting the upper end of the spindle and a fitting 20 screwed into the lower side of the rotor hub 2 and projecting downwardly from it. This joint must be of a universal type to enable the rotor hub to tilt in every direction relative to spindle 13 and shaft 11, but it is only required to carry the axial thrust forces of the rotor lift and weight. Consequently this attaching element may be a cross pivot pin type of thrust connection, such as a Hooke's joint incorporating a ring connector, the central portion of which ring is unobstructed, and is pivoted to the spindle 13 and to the fitting 20 to tilt relative to these two parts, respectively, about mutually perpendicular axes.

It will now be seen that although casing 1 is non-rotative and the rotor hub 2 rotates, the lift of the rotor blades will be transmitted through the hub, fitting 20, universal joint 17, spindle 13, collar 16, thrust bearing 12, hollow shaft 11, and thrust bearing 10 to casing 1 to support the weight of the aircraft attached to such casing. Conversely, the casing will support the rotor structure when the aircraft is on the ground, because its weight will be exerted downward upon universal joint 17, spindle 13, and bearing 14 to the hollow shaft 11. The lower portion of this shaft is carried by a combined radial and thrust bearing 18 received in a cavity in cover 19 which closes the lower side of the casing. It will be seen, therefore, that the rotor hub 2 is held against both upward and downward movement relative to the casing 1, so that vertical forces in either direction will be transmitted between the rotor hub and the aircraft.

Not only is hollow shaft 11 utilized as one element of the structure for transmitting axial thrust forces between the rotor hub and the aircraft, but it also constitutes an element of the driving mechanism for rotating the hub positively by an engine carried by the fuselage. Casing 1 houses a main drive gear 22, which is rotated by conventional drive mechanism, not shown, such as a pinion. This gear is keyed to hollow shaft 11, which in turn is keyed to the spider 21. A collar 23 screwed onto shaft 11 prevents relative longitudinal movement of gear 22 and such shaft, while collar 24 screwed onto the upper end of the shaft prevents spider 21 sliding relative to it. These collars merely act as safety devices, however, for there is no axial load on either such spider or gear, except as collar 23 may assist the shoulder on shaft 11 in transmitting the lift force from such shaft to thrust bearing 10 through the hub of gear 22.

Spider 21 will thus be rotated at the same uniform angular velocity as gear 22 in all rotative positions, and it is very desirable that the blade mounting hub 2 be rotated similarly, not only when its rotative axis is precisely in alignment with the axis of shaft 11, but also when the hub's axis is tilted relative to the shaft's axis. Universal joint 17 will allow hub 2 to tilt universally within limits, but will not transmit rotative force between such shaft and hub, although the hub and spindle 13 are rotatively connected in the mechanism illustrated. In any tilted position the relative angular velocities of the hub and spindle will differ in different rotative positions, but bearings 12 and 14 rotatively isolate the spindle from shaft 11 so that they may rotate relatively and independently.

Figure 2:
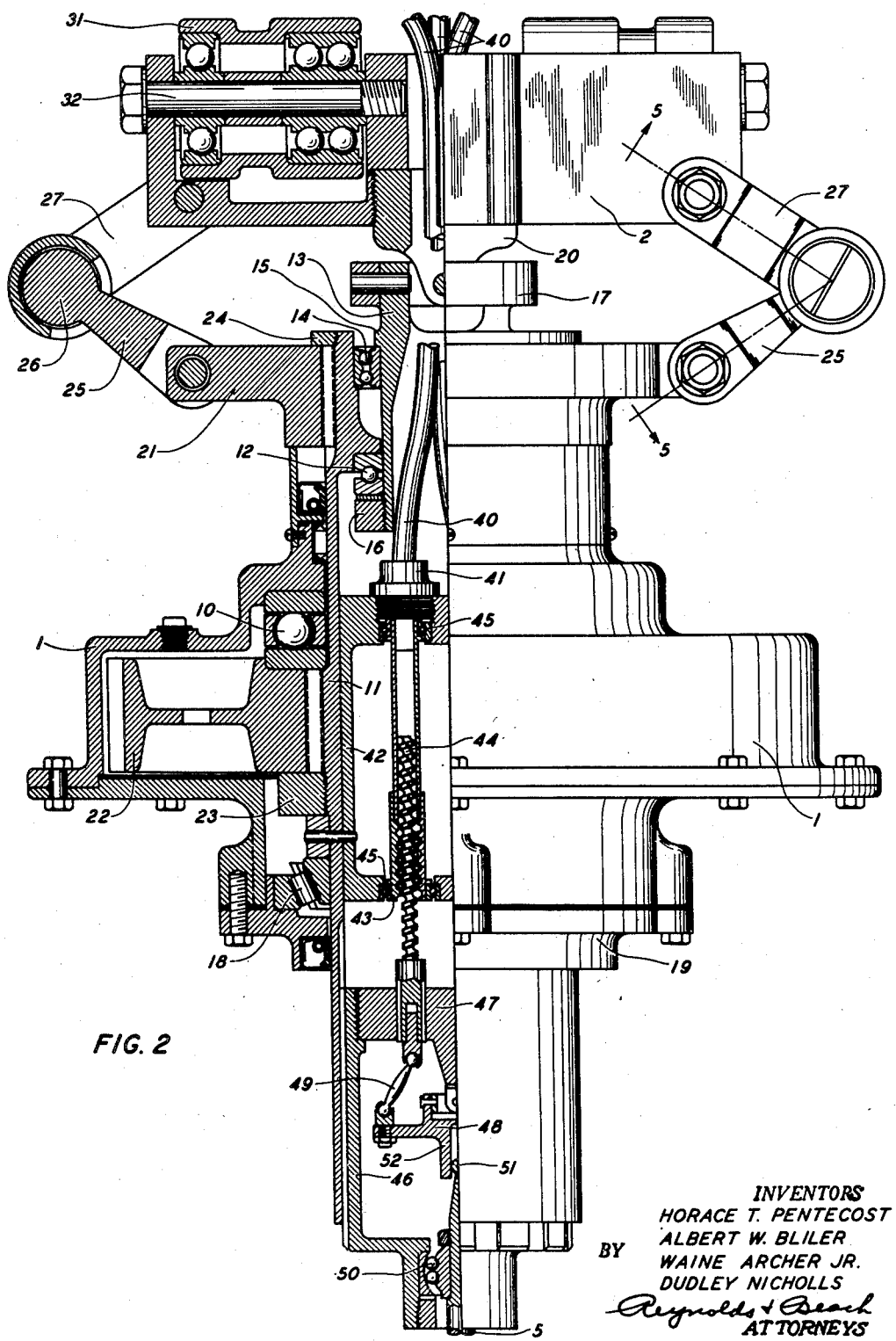
Figure 2 is a side elevation view of the mounting hub of Figure 1 along line 2—2 of Figure 1, showing parts in section.

In order to drive hub 2 at a constant angular velocity in synchronism with the rotation of spider 21, one or more dog-leg linkages are interconnected between the spider and the hub. These linkages will transmit uniform rotary motion but cannot transmit thrust forces axially of hub 2. Figure 5 shows in section an individual linkage, while Figure 2 shows a different section through such a linkage, and also another such linkage in elevation. Each linkage includes a lower link 25 having its lower end formed as a yoke pivotally connected to one arm of spider 21, and having its upper end formed as a ball 26 fitting a complemental socket in the upper link 27, which latter link has a yoke pivoted to hub 2.

As shown best in Figure 5 the yoke of each link is connected to its respective element by a bolt having a long bearing in such element. Consequently link 25 can swing only in a radial plane of spider 21, and link 27 can swing only in a radial plane of hub 2. Since the ball 26 of link 25 is held in link 27 against movement relative to it circumferentially of hub 2, it follows necessarily that the hub must duplicate precisely each angular movement of spider 21. Since the latter is driven at a constant angular velocity, therefore, hub 2 will be driven at the same constant angular velocity. Preferably three linkages 25, 27, spaced equidistantly around the circumference of spider 21 and hub 2, are employed to distribute the rotational load, but more or less than this number may be used if desired.

In order to visualize more clearly the action of these linkages as the hub 2 tilts relative to spider 21 it will be convenient to assume that there are four such linkages, equally spaced at 90 degree intervals. When the axis of hub rotation tilts out of alignment with the axis of hollow shaft 11 in a plane including two linkages of such a four-linkage connection, the included angle, measured in a plane through the links radially of the hub and spider, between the links of the linkage toward which the hub axis tilts will decrease, whereas the corresponding angle between the links of the diametrically opposite linkage will increase. The angles thus measured will be designated included angles, and those between the links of both linkages disposed perpendicular to the plane of rotor hub axis tilt will remain unchanged, but the upper and lower links will no longer lie in a common plane.

In the plane of rotor hub axis tilt, of course, the links of the two linkages will not be relatively canted as measured in a plane tangentially of the rotor hub 2, because the diametral planes of the hub and spider 21 perpendicular to such links' anchor bolts will coincide. The diametral planes of the rotor and the spider perpendicular to the plane of hub axis tilt will not coincide, however, but will intersect. Since the anchor bolts of the upper and lower links remain perpendicular to such rotor and spider diametral planes, respectively, each of these upper links will be canted relative to its companion lower link at an angle equal to the angle of hub tilt relative to the spider. The upper and lower links of these linkages are free to cant thus because of the ball and socket connection between them.

As the spider 21 and hub 2 rotate the included angle between the links of the linkage toward which the hub axis was tilted will increase, and simultaneously the links will be canted increasingly relative to each other until the spider and hub have rotated through an angle of 90 degrees. During their continued rotation through the next 90 degrees the included angle between the links will continue to increase, but the cant angle will decrease until it becomes zero when the linkage reaches the plane of tilt at the side of the rotor away from which the hub axis is tilted. During the next half revolution the links' included angle will decrease again, whereas their cant angle will increase to a maximum during the first 90 degrees of such rotation and decrease to zero again during the next 90 degrees.

It will be appreciated that linkages of the type described cannot transmit axial forces of the rotor's lift or weight between hub 2 and spider 21, although they drive the hub at exactly the same angular velocity as the spider 21 rotates in all rotative positions. Consequently the entire axial forces are carried by the universal joint 17, which need not effect rotational movement. A convenient connecting joint capable of transmitting axial loads is the conventional pin type universal joint illustrated. Such a joint, however, transmits both axial and rotative forces, but its opposite ends do not rotate at similar angular velocities in all rotative positions. On the contrary, when the axes of the two end members are not in alignment, if one member is rotated at a constant angular velocity the other member will rotate at a non-uniform angular velocity, its velocity being greater in certain rotative positions and less in other rotative positions than the velocity of the first member.

Since, as has been pointed out, rotor 2 is driven by spider 21 at a constant angular velocity in all rotative positions through linkages 25, 27, fitting 20 will rotate similarly at constant angular velocity. When the rotative axis of hub 2 is tilted, therefore, the angular velocity of spindle 13 will not be uniform. Relative rotation of this spindle and hollow shaft 11 is possible, however, because of the interposition of bearings 12 and 14 between these members, which enables the spindle to oscillate back and forth relative to shaft 11 as the rotor hub 2 revolves in tilted attitude.

The blades 3 are supported from the hub 2 for limited universal swinging movement about three axes by links 30. The inner end of each link has a bearing 31 received in a cavity 28 of the hub, which is open both upwardly and preferably tangentially at the trailing side. Such bearing is journaled on a bolt 32, extending radially of hub 2, to guide the blade for upward and downward flapping. Each link 30 then extends generally perpendicular to the hub radius through its bearing 31, but it may be offset as shown to locate the center of the blade which it carries in alignment with the radius of the hub perpendicular to that through the bearing.

The other end of each link 30 is pivoted to the blade shaft 33 by an upright pivot 34, enabling the blade to swing circumferentially. This shaft 33 preferably is located in registry with the mean center of pressure of the blade to balance the aerodynamic forces tending to change the angle of attack of the blade, thus to minimize the torque on the shaft. An oscillation damper 35 of conventional type, though preferably hydraulic, is associated with the pivot 34 to limit the extent of angular blade movement relative to link 30, and also to retard the rate at which such angular changes may occur.

Each blade 3 may also rotate about its longitudinal axis to change its angle of attack, but it is preferred that this movement be under the control of the pilot during flight, as will be explained hereafter. The blade is therefore carried by a sleeve 36 which is journaled on shaft 33, and is secured integrally to a gear sector 37 received in a housing 38. This housing in turn is secured by a pin 39 to shaft 33.

The direction of translational flight of a helicopter, or its velocity, may be controlled by varying the angle of tilt of the axis of rotor hub 2. This tilt angle may be changed by increasing the lift of the blades at one side of it and decreasing the blade lift at its opposite side. The lift of any blade may, of course, be altered by changing its angle of attack. Consequently if the angle of attack of the blades can be regulated by pilot controlled movement of gear sectors 37 the degree and direction of tilt of the rotor hub axis may be changed to accomplish the desired flight maneuver. It will be evident, however, that not only must the pilot be able to change the angle of attack of a given blade, but such angle of each blade must vary progressively as it rotates, so that the angles of attack of successive blades arriving at a given orbital position will be the same, even though such angle may be different from that assumed successively by the blades at a different orbital location. Such variation in blade pitch is termed cyclic blade pitch change or control.

Since the angle of attack of each blade must be controllable independently of its change in attitude as it may rise or fall about its pivot pin 32 or forge ahead or retreat about its pivot pin 34, the blade angle is preferably regulated directly by rotating gear sector 37 relative to casing 38. For this purpose suitable gearing is provided, which may incorporate a worm 4 journaled in casing 38, rotated by a flexible shaft 40 and meshing with gear 37. Alternatively a rack meshing with gear 37, or a crank secured directly on sleeve 36, may be reciprocated by a hydraulically operated plunger. Flexible shaft 40 or the hydraulic supply conduit for such blade angle of attack control mechanism passes downward through a central aperture in rotor 2 and through fitting 20, through the ring of the universal joint thrust connection 17 and spindle 13, into the hollow interior of shaft 11.

The lower end of each flexible shaft 40 passes through a different bushing 41 held by a cylindrical block 42, and is secured to a hollow internally threaded sleeve or nut 43. This nut cooperates with a screw member 44 connected with it by bearing balls forming an antifriction screw and nut mechanism. Because of the small frictional force of such a device and the inherent resistance of flexible shaft 40 to twisting, such shaft is rotatable relative to block 42 to drive worm 4 merely by reciprocation of screw 44 lengthwise of nut 43. The lower end of this nut and the portion of shaft 40 immediately above it are guided for such rotation by combined radial and thrust bearings 45, which also prevent lengthwise movement of the shaft and nut.

It will now be evident that the angle of attack of a rotor blade 3 may be changed by axial reciprocation of screw 44, its movement in one direction increasing the blade's angle, and its movement in the opposite direction decreasing such angle. Since shaft 11 rotates hub 2 and the blades 3 carried by it, and since block 42 is fixed in shaft 11, the several shafts 40 will revolve bodily with the rotor assembly. The thrust mechanism for shifting screws 44 must therefore rotate in a similar fashion.

Below block 42 is a further block 46 slidable axially in the lower end of tube 11, but held against rotation relative to the tube, such as by the splines shown. Block 46 has an upper head 47, preferably screwed or otherwise detachably secured to it. This head has splined holes through it slidably receiving the lower ends of screws 44. On the under side of the head 47 is mounted a universal joint which carries a swash plate 48 tiltable universally relative to the head. This plate is rotated with block 46 by the universal joint and has a ball and socket link 49 interposed between it and the lower end of each blade control screw 44. As plate 48 is tilted the link or links 49 on the raised side of the plate will be lifted to push the corresponding screw or screws 44 upward. Simultaneously the link or links 49 connected to the downward tilted side of swash plate 48 will be lowered to draw their corresponding screws 44 downward.

Although, as stated, when the swash plate 48 is tilted the angle of attack of the blades will be decreased while they rotate through one-half a revolution, and increased while they rotate through the remainder of the revolution, return of the swash plate to a position parallel to head 47 will return all the blades to the same angle of attack in all rotative positions. Such angle of attack will be equal to the mean angle of attack of the blades when the swash plate is tilted. Although the direction of the lift force produced by the rotor will thus be changed, the aggregate lift produced by all the blades will remain substantially constant.

If it is desired to vary the amount of lift, either increasing it for ascent or decreasing it for descent, the angles of attack of all the blades may be increased or decreased simultaneously. It is not necessary that all the blades have the same angle of attack to accomplish such operation. The angles of attack of all the blades are changed simultaneously by shifting block 46 bodily lengthwise of hollow shaft 11. Thus if the block is raised the angles of attack of all the blades may be increased simultaneously and correspondingly, whereas if this block is drawn downward, the angles of attack of all the blades will be decreased correspondingly. By such adjustment the total thrust of the rotor may be varied to any degree desired, either independently of a change in the direction of thrust, or at the same time.

The same general type of action may be effected by hydraulic blade control mechanism, except that plungers, instead of the screws 44, would be reciprocated lengthwise of the hydraulic conduits by the swash plate 48. The flow of liquid thus produced would in turn effect reciprocation of blade adjusting racks or levers to control the angles of attack of the blades, as previously mentioned.

Tilting of swash plate 48 is accomplished by a lever 5, which may be swung by the pilot in any direction and to any degree desired. A bearing 50 interposed between such lever and block 46 enables the lever to remain stationary while block 46 is rotating with shaft 11. The upper end 51 of lever 5 is ball-shaped to fit within a cup projecting downward from plate 48. When this plate is tilted in one direction by the lever its rotative axis will not follow a conical orbit as such plate is rotated by the universal joint. On the contrary the rotative axis of plate 48 will be held fixed in direction until lever 5 is again moved. As the rotor, block 46 and plate 48 rotate, therefore, links 49 will alternately be raised and lowered, so that pitch changing member of each rotor blade 3 will successively be drawn downwardly to rotate its shaft 40 for changing the blade's angle of attack in one sense, and forced upwardly to rotate its shaft 40 in the opposite direction for changing the blade's angle of attack in the opposite sense. When lever 5 is in the central position shown screws 44 or equivalent members will not be moved endwise, of course, since plate 48 is then parallel to the head 47 of block 46, and the angle of attack of all the rotor blades will remain unchanged as the rotor rotates.

We claim as our invention:

1. In a rotary wing aircraft, a wing rotor hub, a rotor drive shaft carried by the aircraft and rotatable at a constant angular velocity, supporting means attached to the aircraft and adapted to be supported by said rotor drive shaft, a non-uniform speed universal joint capable of transmitting axial thrust and having one part connected to said wing rotor hub for conjoint rotation therewith, thrust bearing means interconnecting another element of said universal joint and said rotor drive shaft for relative rotational movement of such element and said drive shaft, such universal joint enabling tilting of the hub relative to the rotor drive shaft and being operable to transmit lift forces therebetween, and means independent of said universal joint, interconnecting said rotor drive shaft and said wing rotor hub and operable to rotate the latter in synchronism with said rotor drive shaft at a constant angular velocity in various tilted positions of said rotor hub relative to said drive shaft.

2. In a rotary wing aircraft, a wing rotor hub, a rotor drive shaft carried by the aircraft and rotatable at a constant angular velocity, means interconnecting said rotor drive shaft and said wing rotor hub, and operable to rotate the latter in synchronism with said rotor drive shaft at a constant angular velocity in various tilted positions of said hub relative to said drive shaft, a cross pin universal joint capable of transmitting axial thrust, having its upper end member connected to said wing rotor hub for rotation therewith at a constant angular velocity in various tilted positions of said hub relative to said drive shaft, and bearing means interengaged between the lower end member of said universal joint and said rotor drive shaft and operable to transmit lift forces between said universal joint and said rotor drive shaft in various tilted positions of said wing rotor hub relative to said supporting means, and enabling rotative oscillatory movement of the lower end member of said universal joint relative to said rotor drive shaft.

3. In a rotary wing aircraft, a wing rotor hub, a rotor drive shaft carried by the aircraft and rotatable at a constant angular velocity, a plurality of dog-leg linkages interconnecting said rotor drive shaft and said wing rotor hub, spaced circumferentially about said hub, and operable to rotate the latter in synchronism with said rotor drive shaft at a constant angular velocity in various tilted positions of said hub relative to said drive shaft, a cross pin universal joint capable of transmitting axial thrust, having its upper end member connected to said wing rotor hub for rotation therewith at a constant angular velocity in various tilted positions of said hub relative to said drive shaft, and bearing means interengaged between the lower end member of said universal joint and said rotor drive shaft and operable to transmit lift forces between said universal joint and said rotor drive shaft in various tilted positions of said wing rotor hub relative to said supporting means, and enabling rotative oscillatory movement of the lower end member of said universal joint relative to said rotor drive shaft.

4. In a rotary wing aircraft, a wing rotor hub, a hollow rotor drive shaft carried by the aircraft and rotatable at a constant angular velocity, a spider secured on the upper end of said drive shaft, a plurality of dog-leg linkages interconnecting said spider and said wing rotor hub, spaced circumferentially about said hub and operable to rotate the latter in synchronism with said drive shaft at a constant angular velocity in various tilted positions of said hub relative to said drive shaft, a casing encircling said drive shaft, thrust bearings interengaged between said drive shaft and said casing to prevent appreciable relative movement thereof axially of said drive shaft, a universal joint capable of transmitting axial thrust having its upper member connected to said wing rotor hub, and means received within the upper end of said hollow rotor drive shaft and engaging the lower member of said universal joint to prevent appreciable relative movement thereof axially of said rotor drive shaft, for transmitting lift forces from said wing rotor hub through said hollow drive shaft to said casing and for transmitting gravity forces on said wing rotor hub downward through said hollow rotor drive shaft to said casing.

5. In a rotary wing aircraft, supporting means attached to the aircraft, a rotor hub, a plurality of blades connected to said hub, means interconnecting said supporting means and said hub for tilting of the hub relative to such supporting means and operable to transmit lift forces therebetween, and blade control means carried by the aircraft independently of said blade hub, including rotatable members extending between said supporting means and said blades, operatively connected to said blades, and rotatable by the pilot to vary the angles of attack of said blades during flight irrespective of the degree and direction of tilt of said rotor hub.

6. In a rotary wing aircraft, supporting means attached to the aircraft, a rotor hub, a plurality of blades connected to said hub, means interconnecting said supporting means and said hub for tilting of the hub relative to such supporting means and operable to transmit lift forces therebetween, blade control means carried by said supporting means independently of said hub, including rotatable members extending between said supporting means and said blades, operatively connected to said blades, and rotatable by the pilot to vary unequally the angle of attack of different blades, and means operable automatically to effect cyclic blade pitch change during rotation of said hub so that the blades all successively assume the same angle of attack relative to said rotor hub while passing through a given position irrespective of the degree and direction of tilt of said rotor hub.

7. In a rotary wing aircraft, supporting means attached to the aircraft, a rotor hub, a plurality of blades connected to said hub, means interconnecting said supporting means and said hub for tilting of the hub relative to such supporting means and operable to transmit lift forces therebetween, and blade control means carried by the aircraft including gear mechanism carried by said rotor hub and operatively connected to said blades to rotate them for varying their angles of attack, flexible shafts, one for each blade, operatively connected to said gear mechanism to rotate a gear thereof by rotation of said shafts, means operable by the pilot to rotate all said flexible shafts simultaneously but in different degrees to alter the angles of attack of the blades in varying amounts, and means operable automatically to rotate said flexible shafts continuously during rotation of the rotor, to correlate the rotation of said rotor hub with the rotations of said flexible shafts so that all of said blades successively will assume the same angle of attack relative to said rotor hub while passing through a given position irrespective of the degree and direction of tilt of said rotor hub.

8. In a rotary wing aircraft, a rotor hub, blades connected to said hub, a hollow rotor drive shaft carried by the aircraft and rotatable at a constant angular velocity, a universal joint capable of transmitting axial thrust, interconnecting said rotor hub and said rotor drive shaft for tilting of the hub relative to the rotor drive shaft and operable to transmit lift forces therebetween, means interconnecting said rotor drive shaft and said rotor hub and operable to rotate the latter in synchronism with said rotor drive shaft at a constant angular velocity in various tilted positions of said rotor hub relative to said rotor drive shaft, and blade control means carried by the aircraft including worm and gear mechanism carried by said rotor hub and operatively connected to said blades to rotate them for varying their angles of attack, flexible shafts, one for each blade, operatively connected to said worm and gear mechanism and extending therefrom downward through said hollow rotor drive shaft, means rotatable with said drive shaft, receiving said flexible shafts and guiding the same for rotation but restraining lengthwise movement thereof, a tiltable plate supported from and rotatively connected with said rotor drive shaft, and operable by tilting to rotate all said flexible shafts simultaneously but in different degrees to alter the angles of attack of the blades in varying amounts, means operable at will by the pilot to tilt said plate, and means operable, during rotation of said plate in synchronism with said rotor drive shaft, to maintain its axis of rotation fixed in direction to effect automatic rotation of said flexible shafts during rotation of the rotor, to correlate the rotation of said rotor hub with the rotation of said flexible shafts so that all of said blades successively will assume the same angle of attack relative to said rotor hub while passing through a given position.

9. The combination of claim 8, and means guiding the tiltable plate for bodily shifting lengthwise of the rotor drive shaft to rotate all the flexible shafts simultaneously to the same degree, for varying the angles of attack of all the blades simultaneously and correspondingly.

10. In a rotary wing aircraft, a rotor hub, blades connected to said hub, a hollow shaft carried by the aircraft, a universal joint incorporating an upper end member connected to said rotor hub for rotation therewith, a lower end member, a centrally unobstructed ring interposed between said two end members, and pivot means interconnecting said ring and said two end members for tilting relative to said two end members, respectively, about mutually perpendicular axes, means interconnecting the lower end member of said universal joint and said shaft and operable to transmit lift forces therebetween in various tilted positions of said rotor hub relative to said shaft, blade angle adjusting means carried by said rotor hub and operatively connected to said blades to rotate them for varying their angles of attack, elongated flexible drive elements, one for each blade, operatively connected to said blade angle adjusting means and extending therefrom downward through the unobstructed central portion of said universal joint ring and into the hollow of said shaft, means operable by the pilot to move said flexible drive elements to control said blade angle adjusting means for altering the angles of attack of said blades, and means interposed between said pilot operable means and said flexible drive elements to maintain the blade adjustment established by said pilot operable means irrespective of the degree and direction of tilt of said rotor hub.

11. In a rotary wing aircraft, a rotor hub, blades connected to said hub, a hollow rotor drive shaft carried by the aircraft and rotatable at a constant angular velocity, means interconnecting said rotor drive shaft and said wing rotor hub and operable to rotate the latter in synchronism with said rotor drive shaft at a constant angular velocity in various tilted positions of said hub relative to said drive shaft, a universal joint incorporating an upper end member connected to said rotor hub for rotation therewith at a constant angular velocity, a lower end member, a centrally unobstructed ring interposed between said two end members, and pivot means interconnecting said ring and said two end members for tilting relative to said two end members, respectively, about mutually perpendicular axes, bearing means interengaged between the lower end member of said universal joint and said rotor drive shaft, operable to transmit lift forces therebetween in various tilted positions of said rotor hub relative to said shaft, and enabling rotative oscillatory movement of the lower end member of said universal joint relative to said shaft, blade angle adjusting means carried by said rotor hub and operatively connected to said blades to rotate them for varying their angles of attack, flexible shafts, one for each blade, operatively connected to said blade angle adjusting means and extending therefrom downward through the unobstructed central portion of said universal joint ring and into the hollow of said rotor drive shaft, means operable by the pilot to move said flexible shafts to control said blade angle adjusting means for altering the angles of attack of said blades, and means interposed between said pilot operable means and said flexible shafts to maintain the blade adjustment established by said pilot operable means irrespective of the degree and direction of tilt of said rotor hub.

12. In a rotary wing aircraft, supporting means attached to the aircraft, wing rotor hub means, a freely rotatable thrust connection connected to one of said means, a lift force transmitting pivot pin thrust means interconnecting the other of said means and said thrust connection for tilting of said hub means relative to said supporting means, drive means independent of said thrust means operable to rotate said hub means positively at a constant angular velocity in various tilted positions of said rotor hub means relative to said supporting means, a plurality of blades connected to said hub means, blade control means carried by said supporting means independently of said hub means, operatively connected to said blades, and operable by the pilot to vary the angles of attack of said blades during flight irrespective of the degree and direction of tilt of said rotor hub means, and means operable automatically to effect cyclic blade pitch change progressively during the constant angular velocity rotation of said hub means by said drive means, so that the blades all successively assume the same angle of attack relative to said rotor hub means while passing through a given rotative position irrespective of the degree and direction of tilt of said rotor hub means.

HORACE T. PENTECOST.
ALBERT W. BLILER.
DUDLEY NICHOLLS.
WAINE ARCHER, Jr.

REFERENCES CITED

The following references are of record in the file of this patent:

UNITED STATES PATENTS

| Number | Name | Date |
|---|---|---|
| 1,919,089 | Breguet | July 18, 1933 |
| 2,162,794 | Asboth | June 20, 1939 |
| 2,163,893 | Schairer | June 27, 1939 |
| 2,206,291 | Nelson | July 2, 1940 |
| 2,261,337 | Campbell | Nov. 4, 1941 |
| 2,264,943 | Larsen | Dec. 2, 1941 |
| 2,376,523 | Synnestvedt | May 22, 1945 |

FOREIGN PATENTS

| Number | Country | Date |
|---|---|---|
| 450,586 | Great Britain | July 21, 1936 |
| 790,931 | France | Sept. 16, 1935 |